(12) United States Patent
Zimmerman (10) Patent No.: US 9,739,284 B2
(45) Date of Patent: Aug. 22, 2017

(54) TWO PIECE IMPELLER CENTRIFUGAL PUMP

(71) Applicant: Charles Wayne Zimmerman, Redondo Beach, CA (US)

(72) Inventor: Charles Wayne Zimmerman, Redondo Beach, CA (US)

( * ) Notice: Subject to any disclaimer, the term of this patent is extended or adjusted under 35 U.S.C. 154(b) by 323 days.

(21) Appl. No.: 14/083,751

(22) Filed: Nov. 19, 2013

(65) Prior Publication Data

US 2015/0139828 A1 May 21, 2015

(51) Int. Cl.
| F04B 35/04 | (2006.01) |
| F04D 29/08 | (2006.01) |
| F04D 1/00 | (2006.01) |
| F04D 5/00 | (2006.01) |
| F04D 13/02 | (2006.01) |
| F03B 3/02 | (2006.01) |
| F03B 3/12 | (2006.01) |

(52) U.S. Cl.
CPC .............. *F04D 29/086* (2013.01); *F03B 3/02* (2013.01); *F03B 3/125* (2013.01); *F04D 1/006* (2013.01); *F04D 5/001* (2013.01); *F04D 13/02* (2013.01); *F05D 2260/53* (2013.01); *Y02E 10/223* (2013.01)

(58) Field of Classification Search
CPC ........ F04D 29/086; F04D 1/006; F04D 5/001; F04D 13/02; F04D 29/167; F03B 3/02; F03B 3/125; F05D 2260/53
USPC ................ 417/423.1; 415/171.1, 172.1, 102; 416/186 A, 186 R
See application file for complete search history.

(56) References Cited

U.S. PATENT DOCUMENTS

| 1,061,142 A | * | 5/1913 | Tesla ...................... F04D 19/04 366/265 |
| 1,323,412 A | * | 12/1919 | Schorr .................. F04D 29/041 415/104 |
| 1,757,670 A | * | 5/1930 | Keun ..................... F04D 29/167 415/216.1 |
| 1,881,680 A | * | 10/1932 | Klosson .................. F04D 1/006 415/168.2 |
| 1,908,427 A | * | 5/1933 | Jennings ............... F04D 29/628 415/142 |
| 2,358,744 A | * | 9/1944 | Stepanoff ............ F04D 15/0038 415/131 |
| 2,641,190 A | * | 6/1953 | Johnson .............. F04D 29/2266 415/104 |
| 3,049,081 A | * | 8/1962 | Singelmann .............. F04D 1/12 415/109 |

(Continued)

FOREIGN PATENT DOCUMENTS

| DE | 102008059462 A1 | 6/2009 |
| DE | 102011017339 A1 | 10/2012 |
| GB | 1507108 A | * | 4/1978 | ............. F04D 1/006 |

*Primary Examiner* — Charles Freay
(74) *Attorney, Agent, or Firm* — Sanford Astor (57) ABSTRACT

A two piece impeller centrifugal pump comprising two halves of an impeller facing each other within a volute, a housing having two sides, one side adjacent each impeller half and having an inlet and an outlet, a motor mounted on the housing, the motor driving both impeller halves, for pumping fluid or material from the inlet to the outlet, the housing and the impeller halves having a sealing surface where they contact each other, the centrifugal force of the impeller forcing the fluid or material outward, pushing the two impeller halves outward against the housing.

8 Claims, 13 Drawing Sheets

(56) References Cited

U.S. PATENT DOCUMENTS

| | | | | |
|---|---|---|---|---|
| 4,131,386 A * | 12/1978 | Mabe, Jr. | F04D 29/126 | 415/172.1 |
| 4,383,800 A * | 5/1983 | Becker | F04D 29/426 | 415/101 |
| 4,563,124 A * | 1/1986 | Eskew | F04D 29/628 | 415/102 |
| 4,826,401 A * | 5/1989 | Clark | C23C 8/78 | 415/200 |
| 5,178,520 A * | 1/1993 | Strelow | F04D 13/14 | 415/148 |
| 5,195,877 A * | 3/1993 | Kletschka | A61M 1/101 | 415/900 |
| 5,263,825 A * | 11/1993 | Doolin | F04D 29/128 | 417/423.1 |
| 5,695,471 A * | 12/1997 | Wampler | A61M 1/101 | 417/423.1 |
| 5,827,041 A * | 10/1998 | Charhut | F04D 29/669 | 415/111 |
| 6,511,298 B2 * | 1/2003 | Takura | F04D 13/0606 | 417/350 |
| 6,514,053 B2 * | 2/2003 | Takura | F04D 1/006 | 415/102 |
| 6,896,478 B2 * | 5/2005 | Botros | F04D 29/4233 | 415/101 |
| 7,077,207 B2 * | 7/2006 | Stark | E21B 31/00 | 137/842 |
| 7,274,566 B2 * | 9/2007 | Campbell | H05K 7/2079 | 165/80.4 |
| 8,133,009 B2 * | 3/2012 | Salvesen | F04D 29/023 | 415/118 |
| 8,517,012 B2 * | 8/2013 | Daly | A61M 16/0057 | 128/204.18 |
| 8,721,263 B2 * | 5/2014 | Schmidt | F04D 29/167 | 415/113 |
| 8,747,082 B2 * | 6/2014 | Yi et al. | F04D 13/0633 | 417/366 |
| 9,206,814 B2 * | 12/2015 | Satishchandra | F04D 13/02 | |
| 2001/0028855 A1 * | 10/2001 | Pettenon | F04D 15/0077 | 417/423.1 |
| 2002/0192088 A1 * | 12/2002 | Racer | F04D 7/04 | 417/423.1 |
| 2003/0168064 A1 * | 9/2003 | Daly | A61M 16/0057 | 128/204.18 |
| 2005/0103339 A1 * | 5/2005 | Daly | A61M 16/0057 | 128/204.18 |
| 2006/0147328 A1 * | 7/2006 | Ito | F04D 29/167 | 417/423.1 |
| 2009/0205360 A1 * | 8/2009 | Haley | F04D 17/122 | 62/498 |
| 2009/0234447 A1 * | 9/2009 | LaRose | A61M 1/101 | 623/3.13 |
| 2010/0168848 A1 * | 7/2010 | Horvath | A61M 1/101 | 623/3.13 |
| 2011/0048384 A1 * | 3/2011 | O'Shea | F01C 21/02 | 123/495 |
| 2011/0064566 A1 * | 3/2011 | Wuerdig | F04D 29/167 | 415/174.2 |
| 2011/0176943 A1 * | 7/2011 | Tran | F04D 29/048 | 417/423.1 |
| 2013/0039754 A1 * | 2/2013 | Behnke | F04D 1/006 | 415/208.1 |
| 2013/0039756 A1 * | 2/2013 | Behnke | F04D 1/006 | 415/229 |
| 2013/0142616 A1 * | 6/2013 | Smith | F04D 1/006 | 415/1 |
| 2015/0104335 A1 * | 4/2015 | Faller | F04D 29/5806 | 417/244 |
| 2015/0247506 A1 * | 9/2015 | Lee | F04D 17/105 | 417/366 |
| 2015/0300357 A1 * | 10/2015 | Crom | F01D 15/08 | 415/1 |

* cited by examiner

TWO PIECE IMPELLER CENTRIFUGAL PUMP

TECHNICAL FIELD

The present invention relates to an improved centrifugal pump.

BACKGROUND

Centrifugal pumps are the most common type of pump. A centrifugal pump has two main components, one moving and one stationary. The moving component consists of an impeller and a shaft and the stationary component consists of a housing.

Dynamic pumps, whether they have a standard impeller or a disc design impeller, have a common problem. The problem is the need to have a seal between the inlet (low pressure) side and the outlet (high pressure side). Many attempts have been made to correct or "seal" this problem. The result has always been the same. When the gasket or material sealing the gap between the high and low pressure sides of the pump are worn, the fluid, or material being pumped, leaks between the two. This is primarily caused by the inability of the internal features of the pump to close the gap when the gasket wears away.

Since all efforts have failed to cure this problem, manufacturers have abandoned sealing efforts and have instead designed pumps with a close tolerance to try to control the amount of "blow-by" or leakage between the inlet and outlet. Engineering their pumps in this fashion has made them inefficient. Most estimates show this efficiency to range from 8% to 20% so that the energy being spent to move fluid or material is also being wasted by 8% to 20%. Applicant's new improved pump is more efficient.

In order for a dynamic pump to maintain good pressure, the tolerance between the impeller and the housing must be very close. This prevents or controls the amount of blow-by or mixture of high and low sides. Because this tolerance or gap is so close, any solids in the material being pumped can clog, foul or build up over time and cause friction between the impeller and housing. A small piece of hard material, such as granite, can lodge itself in this gap and physically stop the impeller. This sudden stop most always ends with damage to the equipment. Motor couplings and keyways are designed to reduce costly pump damage, but more often than not, permanent damage will occur to the impeller or housing.

When pumping fluid with a dynamic pump, it almost always has to be primed. While in service, air pockets in the feed line will cause gas or vapor lock. Applicant's improved pump will act as a fan to pump through the air or gas and pull the fluid to the pump. This eliminates the need to prime.

SUMMARY OF THE INVENTION

The invention is a centrifugal pump comprising a housing, having an inlet, an outlet and a volute. A motor is mounted on the housing. The motor rotatably drives a two piece impeller within the volute, for pumping fluid, or other material, through the housing from the inlet to the outlet. The pump has seals between the inlet, or low pressure, and the outlet, or high pressure, areas of the pump. As the centrifugal force of the two piece impeller forces the fluid outward, it is restricted by the concave shape of the two parts of the impeller. This creates pressure and pushes the two impeller portions outward to force the two halves of the impeller apart. This creates a sealing point between each impeller part and the housing, at a flat surface of contact between the two. A Teflon washer, or other suitable material, is inserted in between the impeller and the housing to reduce wear and friction. The more pressure created between the two parts of the impeller and the housing, the better the seal is between them.

The pump of this invention has a close tolerance only at the output point or perimeter of the impeller. The centrifugal force and speed of fluid or material at this point greatly reduces the chance of any debris being lodged in this area. If solid material occurs, it is easy enough to reduce seal width at the contact point between the impeller and the housing. This will increase the gap between the two sides or halves of the impeller to ensure that the solids pass through unobstructed.

Maintenance on the new pump of this invention is straight forward. The use of Teflon washers and brass bushings will keep rebuilding costs down. The pump disassembles from one end, as do most existing dynamic pumps. Inspection of alignment pins and impeller veins can be done easily and all washers, bushings, seals and bearings can be replaced at once with minimal time and stock.

The above advantages and various other advantages and features may be recognized by those of ordinary skill in the art based on the following detailed description when taken in conjunction with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
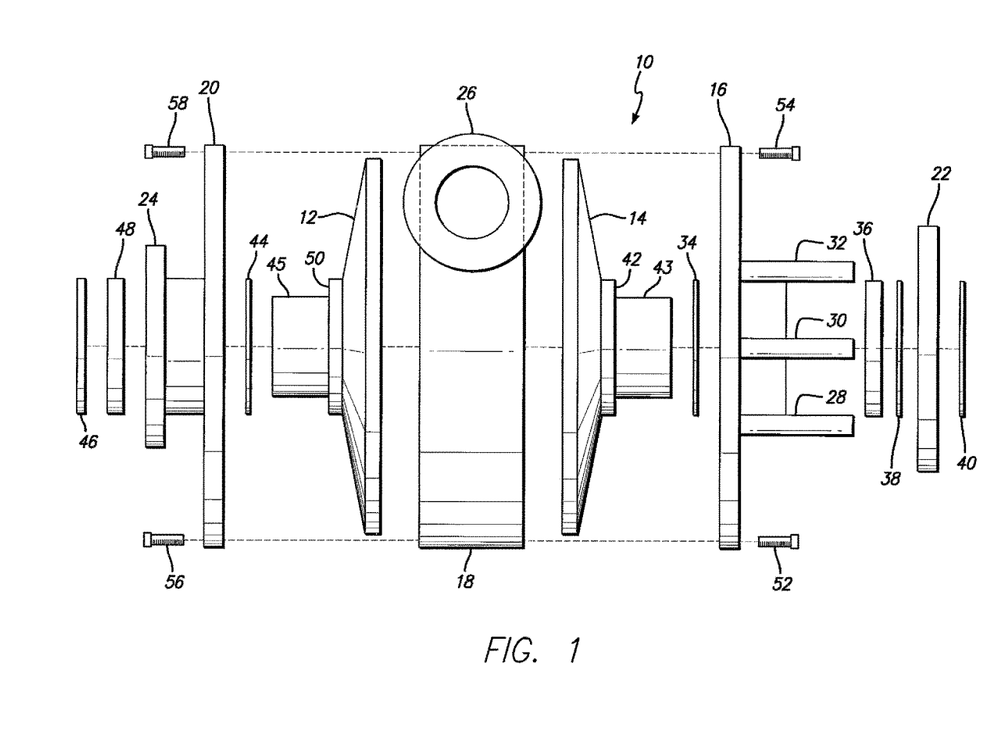
FIG. 1 is an exploded view of a dual intake pump of this invention.

Referring to FIG. 1 there is shown an exploded view of dual intake pump 10 of this invention. There are two impeller parts 12 and 14. The housing is shown in three parts, the drive side housing 16, the center portion housing 18 and the non-drive housing portion 20. There are two pipe flanges 22 and 24. There is also an output pipe flange 26, part of housing 18. There are shown three of a plurality of flange mounting studs 28, 30 and 32.

On the drive side there is an inner sealing ring 34 and a bearing 36 to hold the impeller inlet tube 43 allowing it to rotate. Seal 34 sits between housing 16 and impeller part 14 at impeller ridge 42. Seal 40 sits between pipe flange 22 and inlet tube 43. Seal 38 sits between inlet tube 43 and housing 16. On the non-drive side, seal 44 seals housing 20 against impeller 12 at impeller ridge 50. Bearing 48 holds impeller inlet tube 45. Seal 46 seals pipe flange 24 to inlet tube 45. Seal 46 and bearing 48 fit between housing 20 and inlet tube 45. Bolts 52, 54, 56 and 58 are four of a plurality of bolts, which connect together the three parts of the housing 16, 18 and 20.

Figure 2:
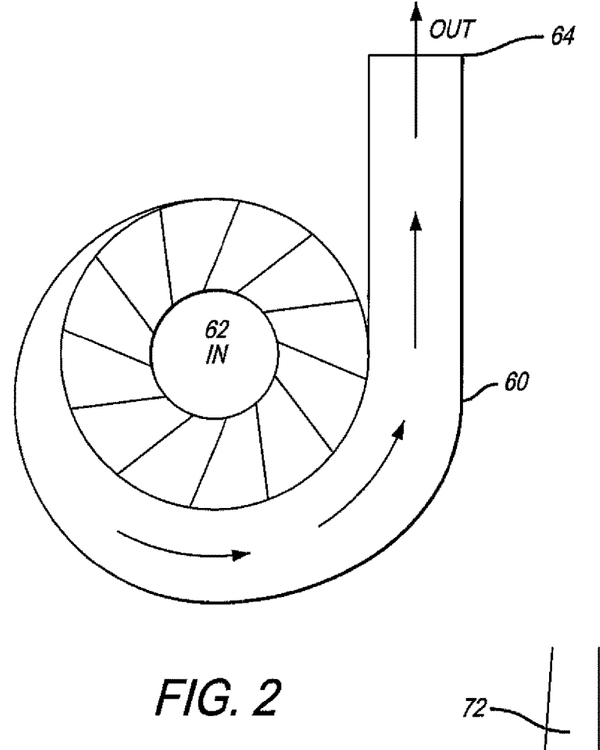
FIG. 2 shows a side view of a pump of this invention.

Referring to FIG. 2, there is shown what looks like a standard dynamic pump 60 with an inlet 62 and an outlet 64. The major difference between the pump of this invention and standard dynamic pumps is the center shaft. Unlike a standard dynamic pump the center 62 is hollow like a pipe and is the intake.

Figure 3:
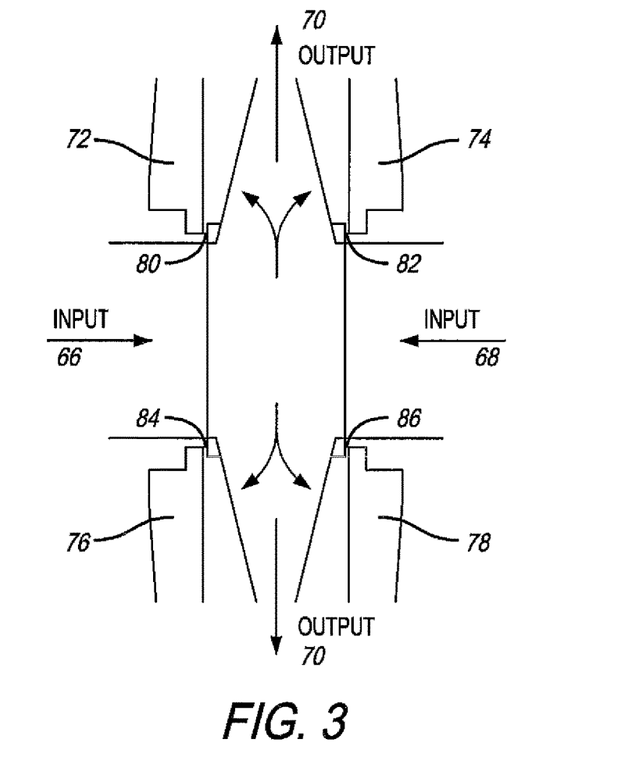
FIG. 3 shows a flow diagram of the pump.

FIG. 3 is a diagram depicting the fluid passage, having a dual input 66 and 68 and output through volute 70. The cut-away diagram shows four points of the housing 72, 74, 76 and 78, the housing being circular. There are depicted four contact points 80, 82, 84 and 86 between the housing and the impeller, also circular. As the centrifugal force of the impeller forces the fluid outward, it forces the two halves of the impeller apart. This creates a sealing point 80, 82, 84 and 86 between the impeller and the housing, at a flat surface of contact between the two surfaces. A Teflon washer or other suitable material can be inserted in between to reduce wear and friction. The more pressure created between the two halves of the impeller, the better the seal between the impeller and the housing.

Figure 4:
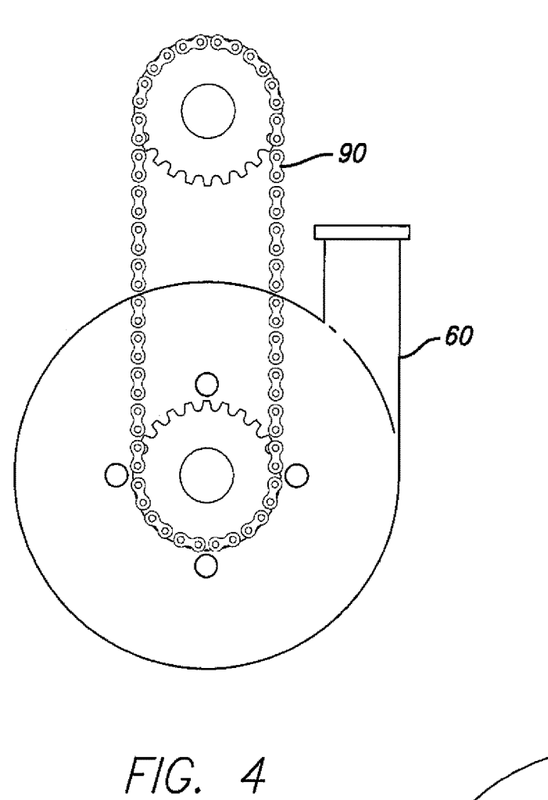
FIG. 4 shows a chain or belt drive for the pump.
Figure 5:
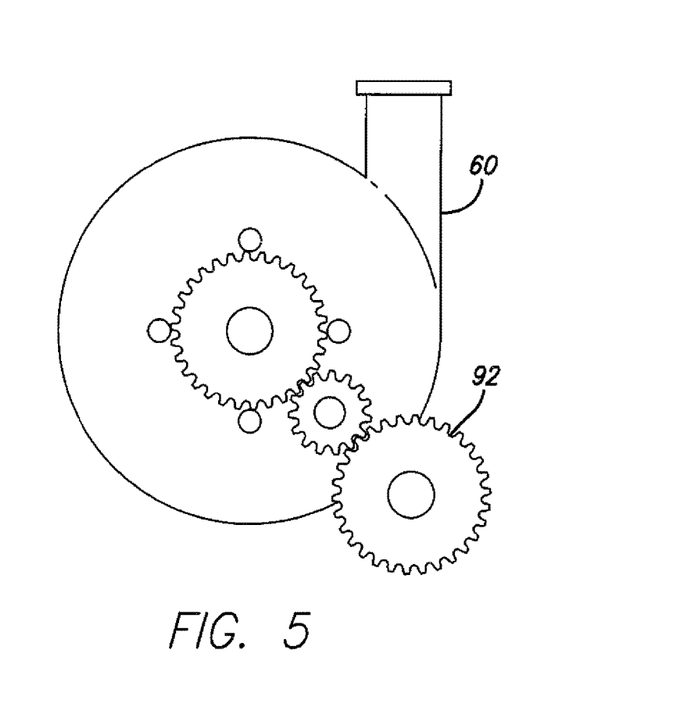
FIG. 5 shows a gear drive for the pump.

Referring to FIG. 4, there is shown a basic dynamic pump 60 of the invention where the pump is driven by a chain drive 90. FIG. 5 shows the same basic dynamic pump 60 where the pump is driven by a gear drive 92.

Figure 6:
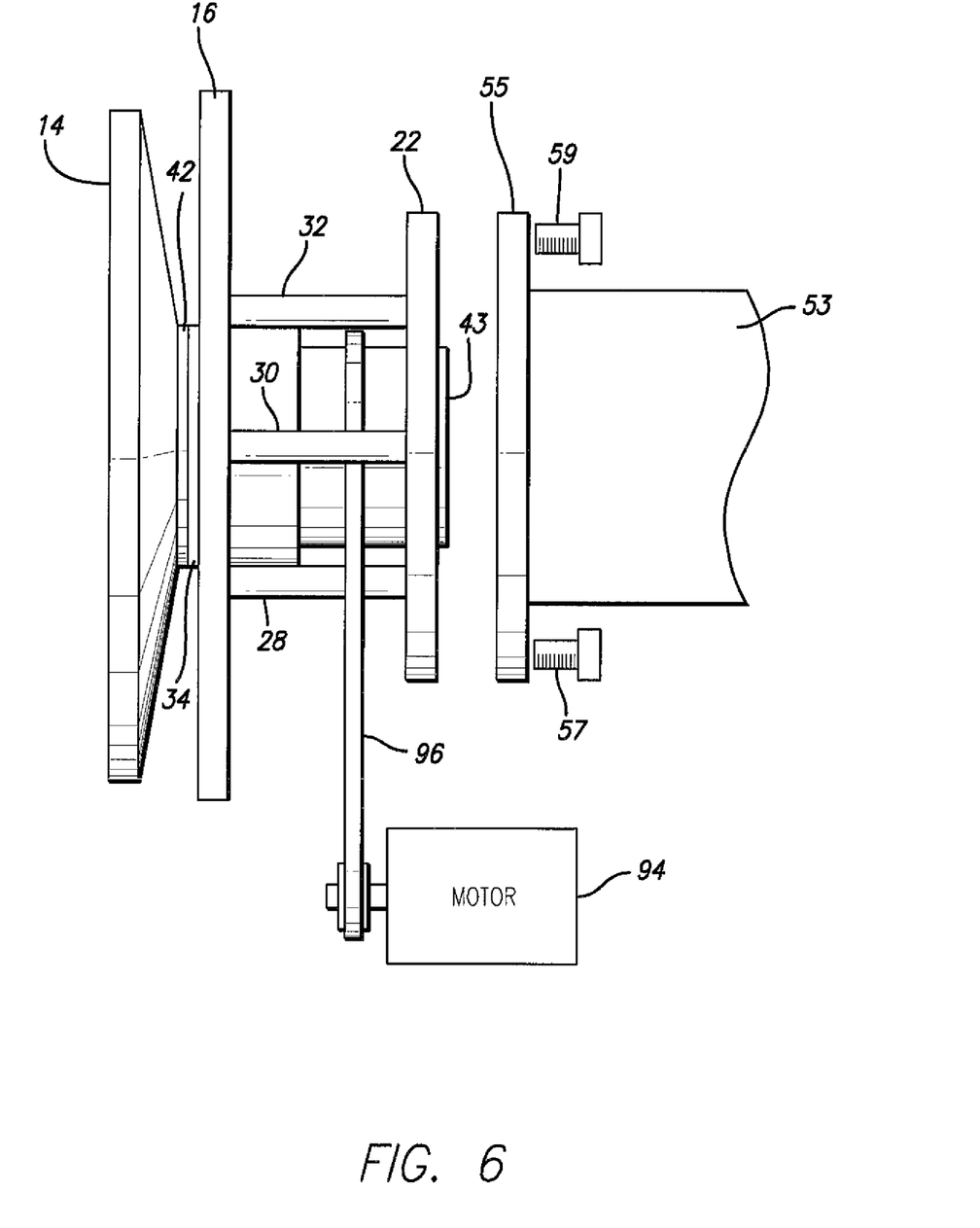
FIG. 6 is a top view of the drive side of a dual intake pump.

Referring to FIG. 6, there is shown the drive portion of the pump of FIG. 1, and also shows the pump drive motor 94 with a belt drive 96. Also shown is pipe supply line 53 with pipe supply line flange 55. Bolts 57 and 59 are two of a plurality of bolts to connect with flange 22.

Figure 7:
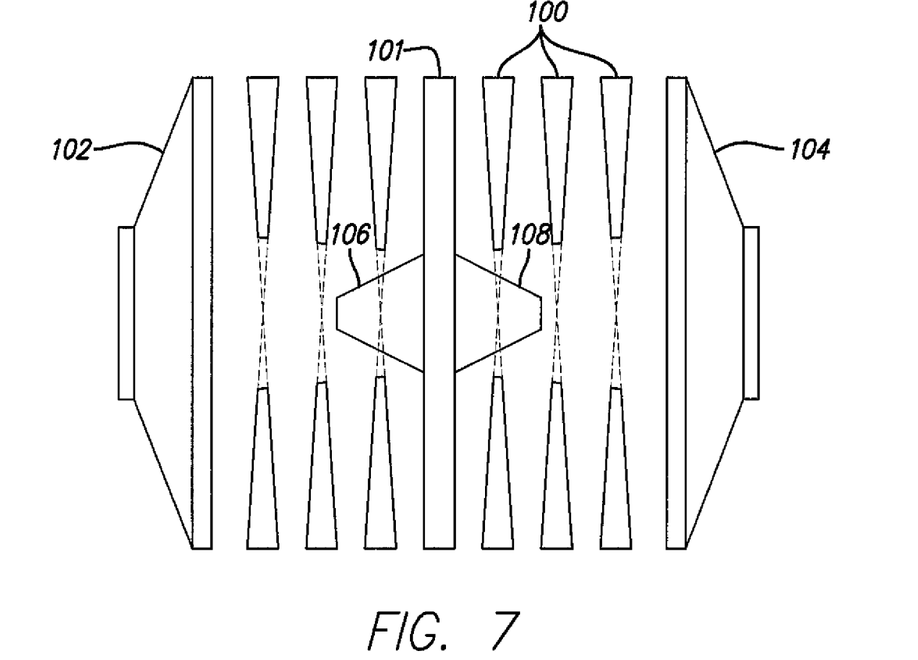
FIG. 7 is a top view of a dual intake disc pump.

The same principles used in a dynamic pump may also be used in a disc style pump. A standard disc pump has discs that are flat. The disc pump of this invention has concave discs. Referring to FIG. 7, there is shown multiple concave discs 100 of impeller halves 102 and 104. The center disc 101 is not concave. The concave shape of the discs will allow pressure between discs 100 to increase as the flow of material moves outward while the pump is in motion. This increase in pressure will ensure a tight seal between the impeller halves 102, 104 and the housing, not shown here, but shown in FIG. 1.

Figure 8:
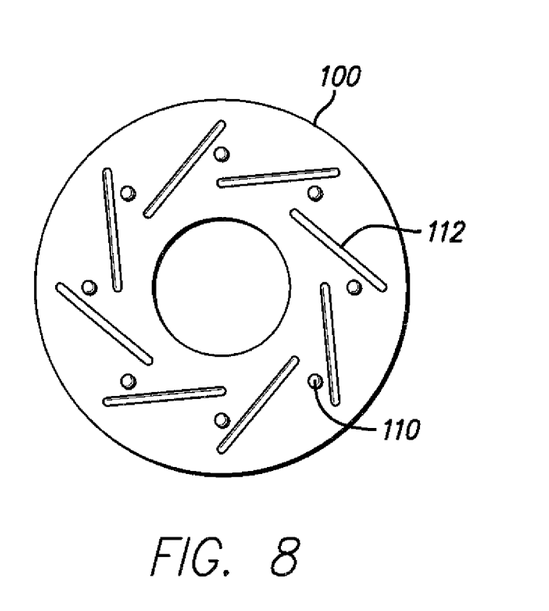
FIG. 8 is a side view of an impeller disc.
Figure 9:
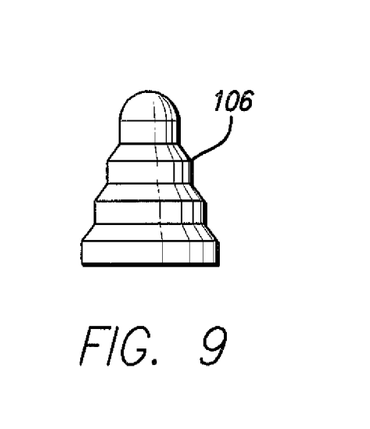
FIG. 9 is a side view of a cone spreader.

Distribution cones or spreaders 106 and 108 help to spread the fluid or material being pumped between the discs equally. In order to maximize the flow from the pump and ensure needed pressure the discs need to be equal distances apart. Each disc will be moving the same amount of material. The length, width and shape of the distribution cones 106, 108 will change dependent upon the material being pumped, the amount of flow, and the size and number of the discs. FIG. 8 shows the front of a disc 100 with multiple pins 110 and multiple ridges or bumps 112, which also help to spread the material being pumped. The center disc 101 is not concave and has distribution cones 106, 108 on both sides. FIG. 9 is a front view of spreader 106 and 108.

Figure 10:
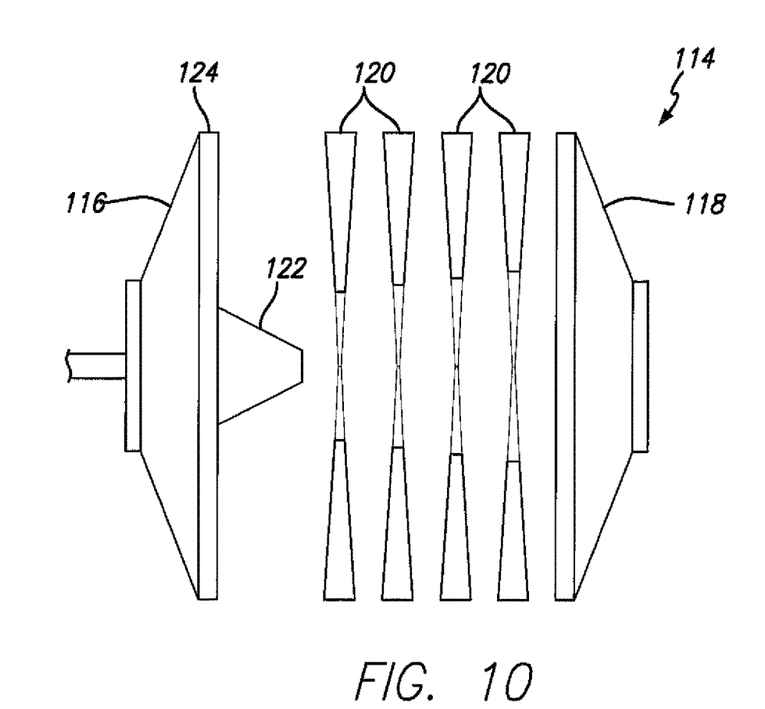
FIG. 10 is a top view of a single intake disc pump.
Figure 11:
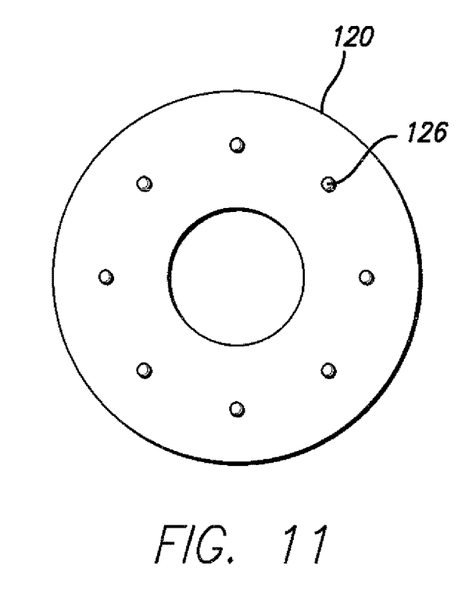
FIG. 11 is a front view of an impeller disc.
Figure 12:
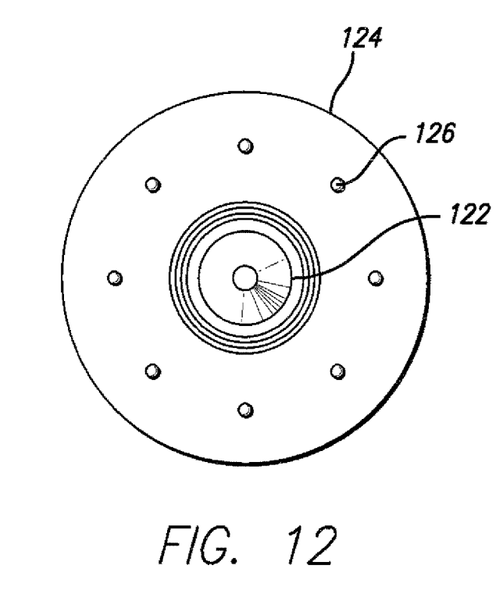
FIG. 12 is a front view of an impeller disc assembly.

FIG. 10 depicts a single inlet disc pump 114 with the principle set forth above. Disc pump 114 has impeller halves 116, 118 and multiple concave discs 120 and distribution cone or spreader 122. The housing is not shown. FIG. 11 shows a disc 120 with pins 126 but without ridges or bumps. FIG. 12 shows a front view of a disc assembly 124 with pins 126 and a front view of spreader 122.

Figure 13A:
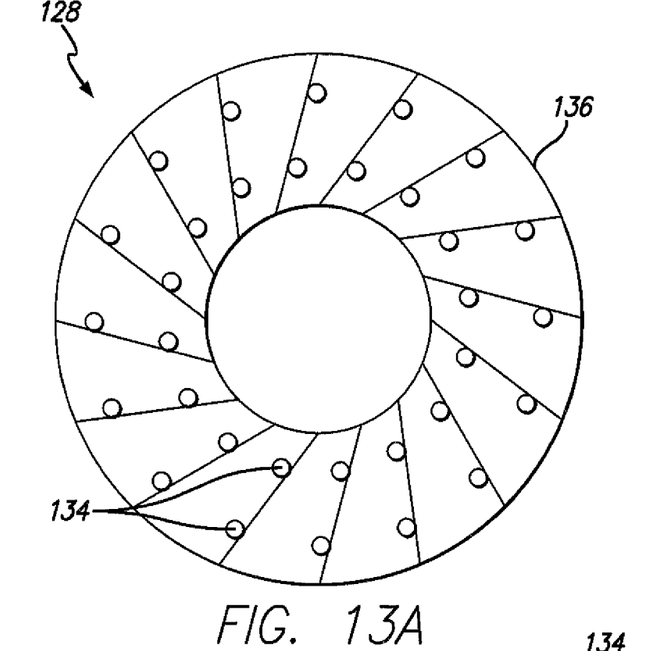
FIG. 13A is a detailed front view of an impeller disc.
Figure 13B:
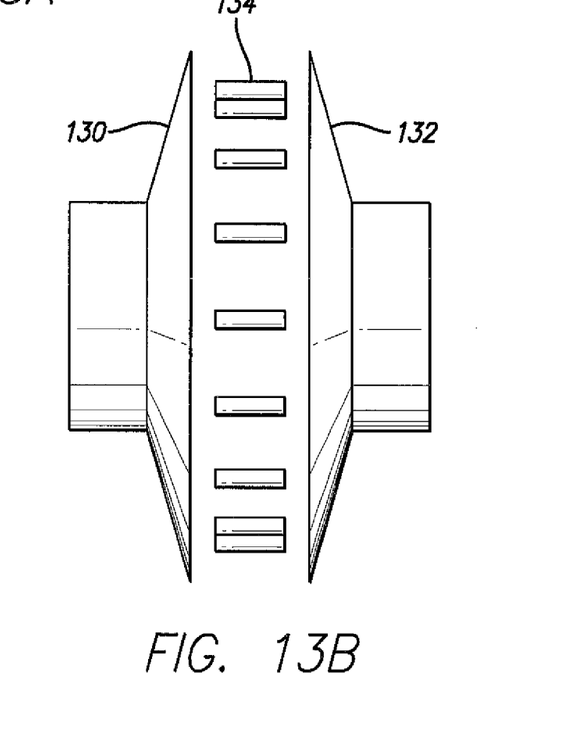
FIG. 13B is a top view of the impeller halves and pins.

FIG. 13B shows an impeller disc 128 from a top view of FIG. 13A. 13B is a top view of two impeller halves 130 and 132, held together by pins or dowels 134. The discs, comprised of a plurality of blades or vanes 136, float on pins 134. The blades and pins can be manufactured as one piece. However, it is better if the blades float on the pins which hold the two parts together, as shown in FIG. 13B. Optionally, bushings could be installed where the pins insert into the two halves of the impeller 130, 132. This would ensure that the two cone-shaped impeller halves should never have to be replaced. All the parts needed to rebuild the entire pump could be sold as a kit.

Figure 14A:
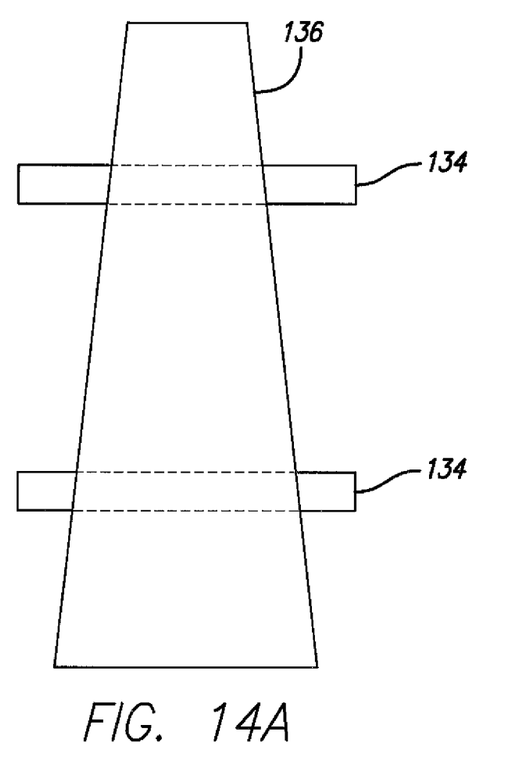
FIG. 14A is a front view of an impeller disc blade.
Figure 14B:
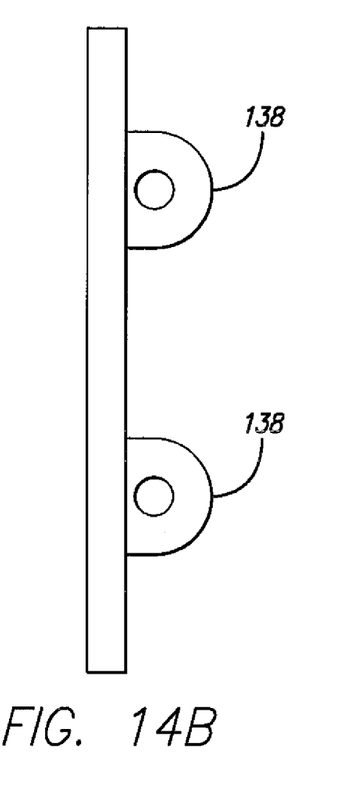
FIG. 14B is a side view of an impeller disc blade.

FIGS. 14A and 14B show an impeller disc blade 136 with pins 134 and pin holders 138, which are part of the blade 136. The pins and blades could be made as one unit, as stated above. The pins 134 should be made of hardened steel to resist breakage. The blades 136 could be made of a softer metal to break off and not transfer energy to damage the pins. A brass bushing could be placed around the pins to protect them from wear. These bushings would be inserted around pins 134.

Figure 15:
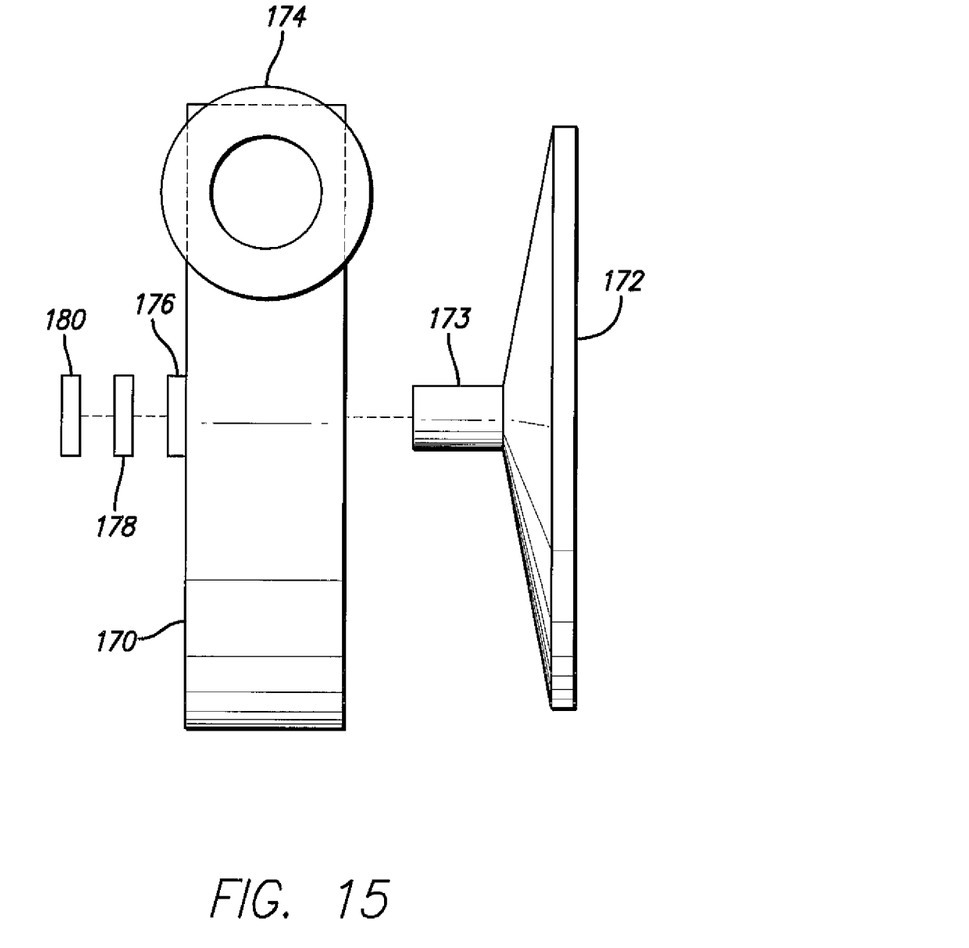
FIG. 15 is one half of the housing and impeller of a single intake pump.

FIG. 15 shows one side of a single-sided pump with housing 170 and outlet pipe flange 174. An impeller half 172 has an input shaft 173. Bearing race 176 is part of housing 170. Bearing 178 and sealing ring 180 seal input shaft 173 to the housing. Most designs utilize an electric motor to power the pump. In this configuration the half of the impeller that is connected to the motor shaft is stationary. All of the force generated between the two halves of the impellers push to the inlet side and seal between the high and low pressure sides. The inlet or supply line bolts to the housing with the inlet tube of the impeller being inside of the supply line.

Figure 16:
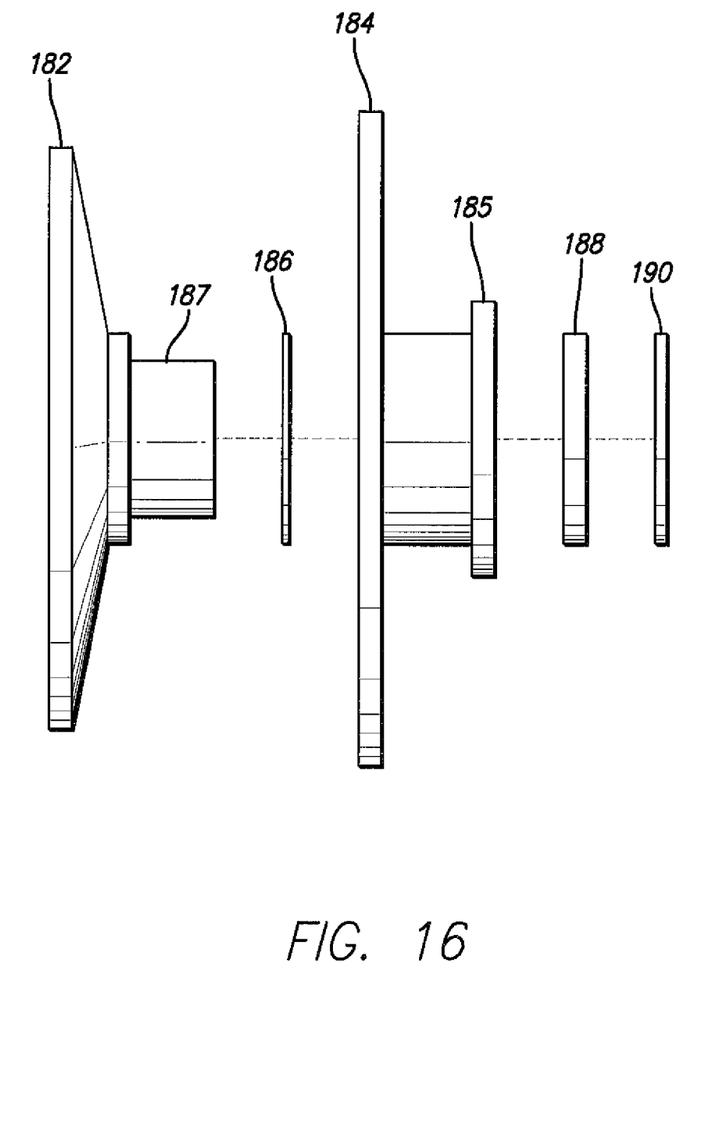
FIG. 16 is the other half of the housing and impeller of a single intake pump.

FIG. 16 shows the other side of the single-sided pump shown in FIG. 15. There is impeller 182, sealing ring 186, housing 184, pipe flange 185, bearing 188 and sealing ring 190 which seal inlet tube 187 to housing 170, shown in FIG. 15.

Figure 17:
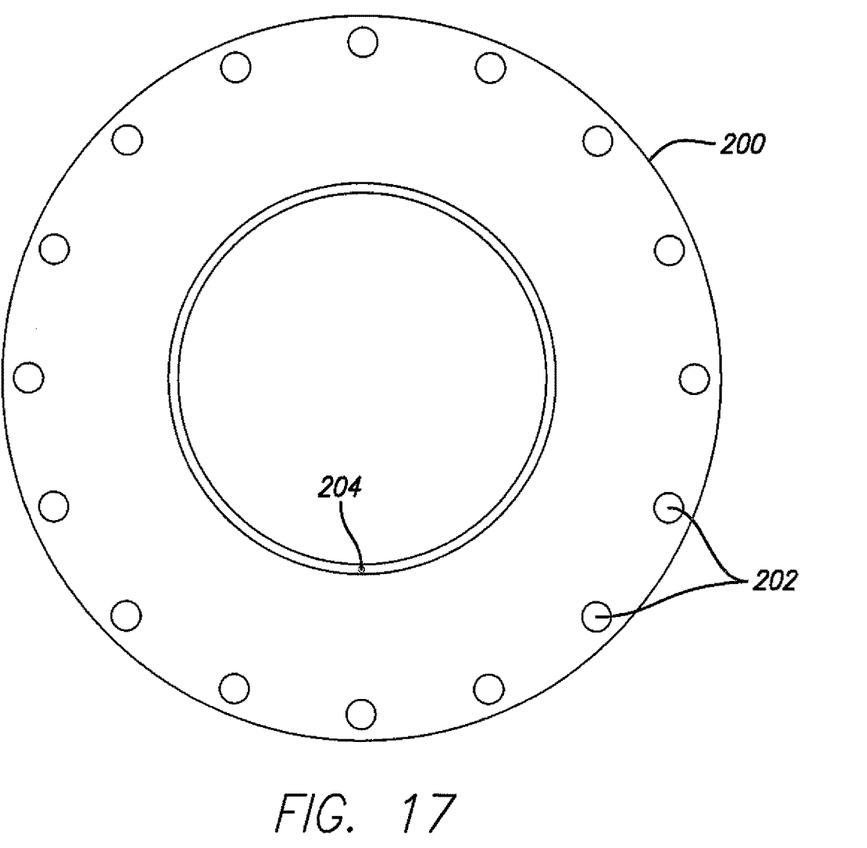
FIG. 17 is a side view of the inlet side housing with a weep hole.
Figure 18:
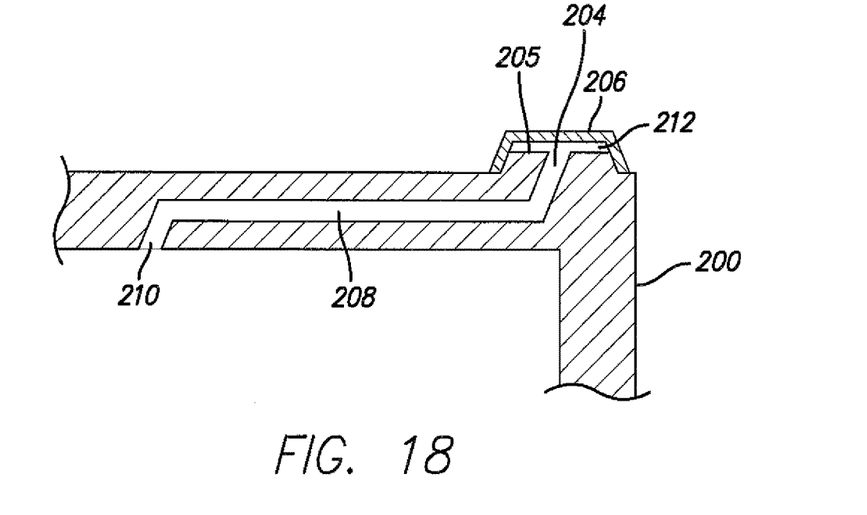
FIG. 18 shows a seal ridge and weep hole chamfer in the housing.

FIG. 17 shows housing 200 with multiple studs 202 for connection, as best shown in FIG. 1 as housing 16. There is a weep hole 204 in the intake side of housing 200. FIG. 18 shows a cut through the intake side of housing 200. There is a shoulder 205 and the weep hole 204 in the intake side of housing 200. A canal 208 which starts at air gap 212 and ends at the weep hole outlet 210. If liquid passes through canal 208, it indicates a leak at seal 206. The pump then needs to be disassembled and a new seal put in place.

The pump principle of this invention can be applied equally to turbines. When the impeller is configured so that the constriction is in the center and flow is reversed, torque will be applied at the output tubes, or tube and shaft if used in a single-sided configuration.

Figure 19:
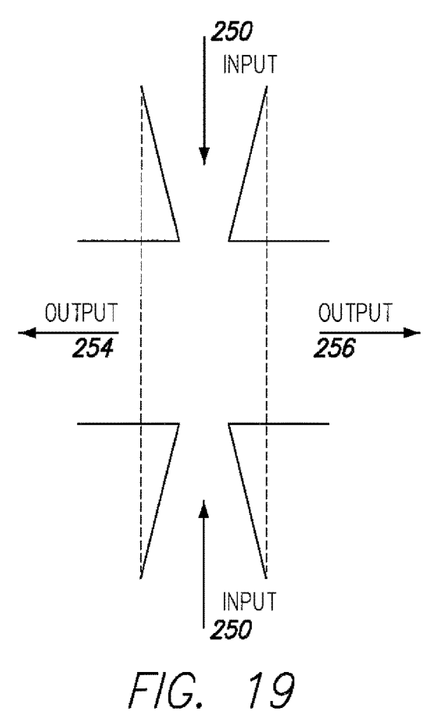
FIG. 19 is a diagram which depicts the flow of a turbine.
Figure 20:
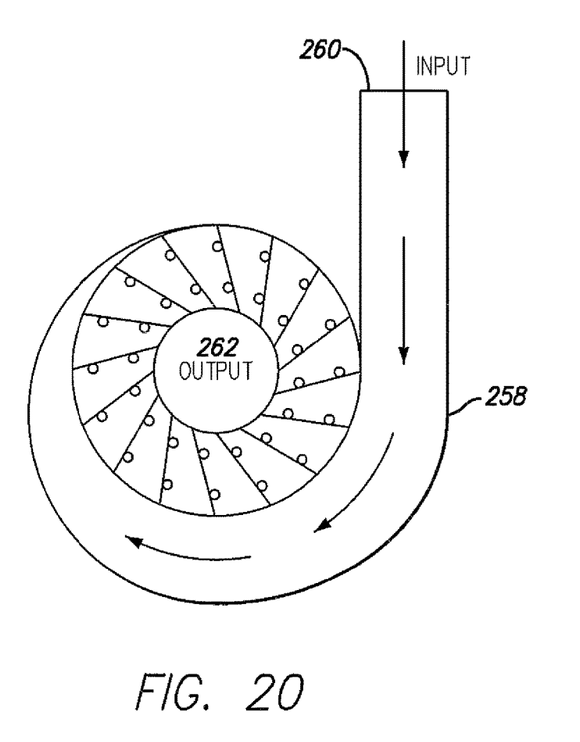
FIG. 20 is a side view of a turbine of this invention; and,
FIG. 21 is an exploded view of a turbine of this invention.

Referring to FIG. 19, there is a diagram which depicts the basic flow of a turbine having an input 250 and a dual outlet 254 and 256. FIG. 20 shows a basic turbine 258 with an input 260 and an output 262, a dual output using the same principles as the pump.

Figure 21:
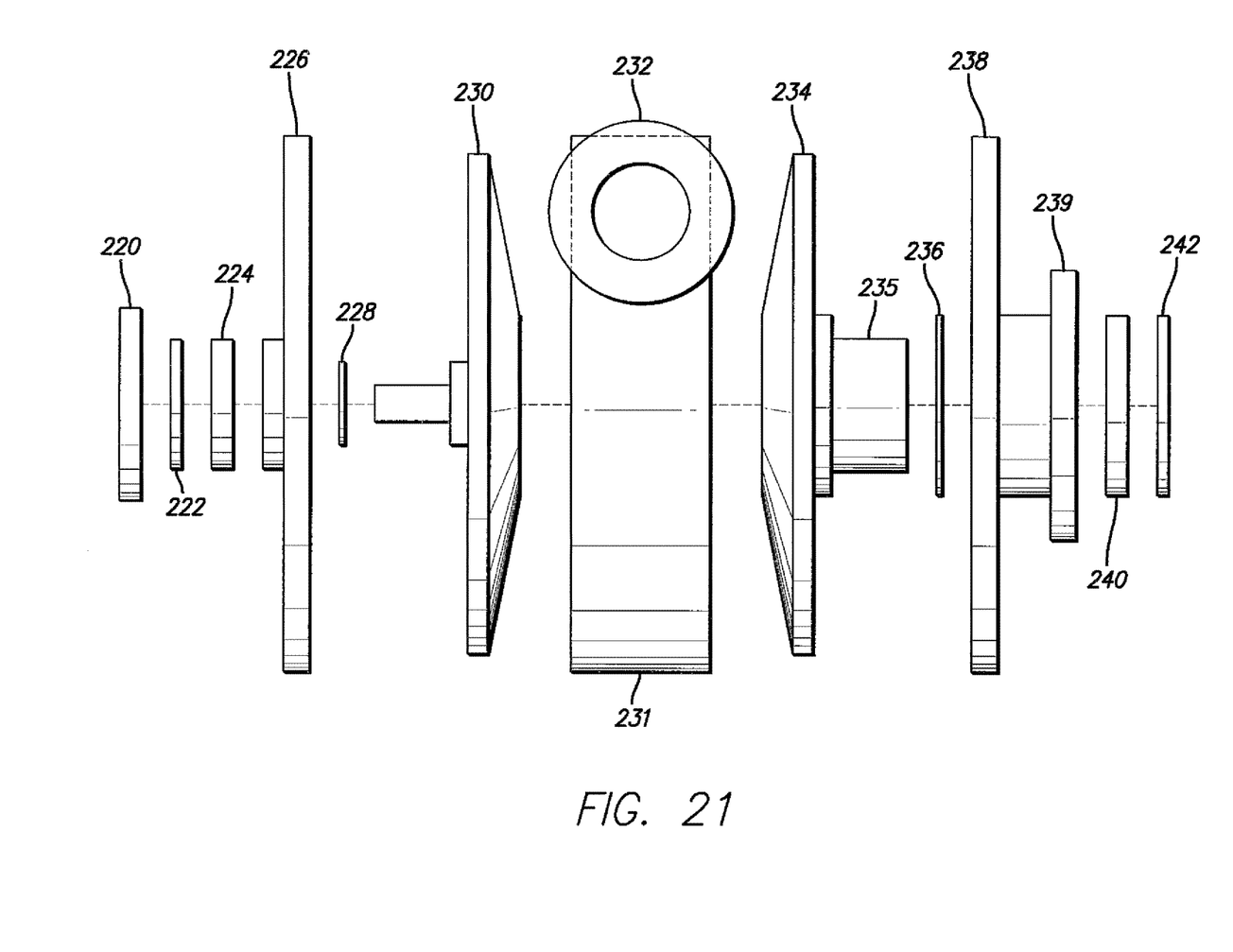

Referring to FIG. 21 there is shown an exploded view of a turbine. A sprocket, gear or pulley 220 is designed to apply torque to the equipment. There is an output shaft seal 222, an output shaft bearing 224, and an output shaft housing 226. An internal sealing ring 228 on the output shaft side keeps internal pressure from contaminating bearing 224. One half 230 of the impeller is on the output shaft side. The center section 231 of the housing has an input flange 232. On the output side is the other impeller half 234, the two impeller halves facing away from each other. There is an output side internal sealing ring 236 at output tube 235. The output side housing 238 is complete with a flange 239 for the output pipe or tubing. There is an output tube or pipe bearing 240 and an output tube seal 242.

Housings 232 and 226 could be combined to reduce production costs, as seen with the pump single side version. Impeller discs or blades and pins are installed between impeller halves 230 and 234 so that the constriction is at the inside of the impeller at the outlet tube or tubes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications.

What is claimed is:

1. A centrifugal pump comprising:
    a single impeller having two separate halves which face each other within a volute;
    at least one impeller half having an inlet tube which rotates with the impeller;
    the impeller halves held together by pins with blades floating on the pins, the blades not being connected to the impeller halves;
    a housing having three components, one housing component containing the two impeller halves and comprising an outlet, and two outer housing components, each one adjacent to one of the two impeller halves and at least one outer housing component having an inlet;
    a motor mounted on the housing, the motor driving at least one impeller half, to pump fluid or material from the inlet to the outlet;
    the impeller half having the inlet tube and also having an impeller ridge between the inlet tube and the impeller half, and a seal which slides over said inlet tube and sits perpendicular between the impeller ridge and the housing;
    the centrifugal force of the two impeller halves forcing the inlet fluid or material outward, pushing the two impeller halves apart, the impeller half with an inlet tube forced against its adjacent housing.

2. The centrifugal pump of claim 1, in which both impeller halves have an inlet tube so that the fluid or material enters the pump through both impeller halves.

3. The centrifugal pump of claim 1, in which the fluid or material exists the pump through the housing component comprising an outlet.

4. The centrifugal pump of claim 1, further comprising a pipe flange attached to the housing.

5. The centrifugal pump of claim 1, in which each of the two outer housing components has a bearing for supporting rotation of the impeller halves.

6. The centrifugal pump of claim 1, in which there is a single inlet.

7. The centrifugal pump of claim 1, further comprising a weep hole in the housing in which a leak through the weep hole indicates that a seal needs replacement.

8. A centrifugal pump for moving fluid or material from an inlet to an outlet comprising:
    a single impeller having two separate halves which face each other within a volute;
    at least one impeller half having an inlet tube and an impeller ridge which rotates with the impeller;
    the impeller halves held together by pins with blades floating on the pins, the blades not being connected to the impeller halves;
    a housing having three components, two outer housing components each adjacent an impeller half, at least one outer housing component having an inlet flange and the third component comprising an outlet;
    a motor driving both impeller halves, to pump fluid or material from the inlet to the outlet;
    the impeller half having the inlet tube also having a seal which slides over said inlet tube and sits perpendicular to said inlet tube between the impeller ridge and the housing; and,
    the centrifugal force of the fluid or material forcing the two impeller halves apart from each other against the adjacent housing.

* * * * *